Patented Aug. 22, 1939

2,170,030

UNITED STATES PATENT OFFICE 2,170,030

PREPARATION OF MIXED DICARBOXYLIC ACID ESTERS OF POLYHYDROXY COMPOUNDS AND MONOHYDROXY ALCOHOLS

Carl J. Malm and Charles R. Fordyce, Rochester, N. Y., assignors, by mesne assignments, to Eastman Kodak Company, Rochester, N. Y., a corporation of New Jersey No Drawing. Application December 4, 1935, Serial No. 52,878

3 Claims. (Cl. 260—475)

This invention relates to the mixed dicarboxylic acid esters of polyhydroxy compounds and monohydroxy alcohols, such as for example, ethylene glycol diethyl diphthalate and their compositions with cellulose esters. The present application is a continuation-in-part of our copending application, Serial No. 632,560, filed September 10, 1932 which has matured into Patent #2,023,485.

Our invention involves the preparation of these mixed esters by reacting upon a dicarboxylic acid ester of a polybasic compound in which one of the carboxyl groups of the acid is free and unesterified with a monohydroxy alcohol to form an ester containing both alkyl groups and groups derived from the polybasic compounds and the products formed thereby. Our invention also involves the plasticizing of organic acid esters of cellulose with these mixed dicarboxylic acid esters. Compositions of matter comprising cellulose esters may be employed to produce valuable products of various kinds, such for example, as sheeting, molded products, rods, tubes, artificial leather, etc. As plasticizers for cellulose derivatives these mixed dicarboxylic acid esters are unique in that they are, as a class, highly compatible with cellulose derivatives and, due to their high molecular weight, have very low vapor pressures. They are entirely insoluble in water, making them useful in compositions where moisture resistance is an important factor.

We have found that the acid dicarboxylic acid esters of polyhydroxy compounds prepared according to the process described in our Patent No. 2,023,485, may be caused to react with a monohydroxy alcohol, such as methyl or ethyl alcohols thereby esterifying the remaining carboxyl group. We have found that dicarboxylic acid esters so prepared which contain both monohydroxy alcohol and a polybasic alcohol substituent may be incorporated with a cellulose ester to form a composition possessing a good and permanent flexibility which is suitable for employment in any connection in which plasticized cellulose esters are employed at the present time.

The acid dicarboxylic acid esters of polyhydroxy compounds which are employed as the starting material in the process of the present invention are prepared by reacting upon a polyhydroxy compound with the anhydrid of the dicarboxylic acid at an elevated temperature, such as approximately 100° C. in the presence of at least an equivalent amount of a tertiary base, such as pyridine or quinoline. This process is thoroughly described in our copending application, Serial No. 632,560 now Patent No. 2,023,485, which is a parent of the present application.

The acid dicarboxylic acid ester of a polyhydroxy alcohol is esterified by reacting upon the compound with a monohydroxy alcohol by treating it with an excess of the alcohol preferably in anhydrous form in the presence of a catalyst; for example, about 10 pounds of ethylene glycol acid diphthalate was dissolved in 60 to 80 pounds of anhydrous ethyl alcohol into which was introduced about 1% of dry HCl gas. The whole was allowed to stand at about 20° C. for approximately 24 hours at the end of which time the HCl and alcohol were distilled off. The ethylene glycol diethyl diphthalate formed was refined by dissolving it in ether, washing the ether solution with aqueous sodium carbonate and drying it with calcium chloride. The ether was then distilled off and the product obtained as residue.

This process is susceptible of use with any of the compounds which have been described as suitable in the present or the parent case.

Although due to their commonness, the use of methyl or ethyl alcohol is ordinarily preferred for esterifying the acid dicarboxylic esters, nevertheless, other monohydroxy alcohols may be employed for this purpose. Any of the acid dicarboxylic compounds described in our copending application will be found to be susceptible to further esterification by the monohydroxy alcohols in accordance with the present application. Substituted alcohols such as B. methoxyethyl alcohol may also be used.

These dicarboxylic acid esters in which the hydrogen of one carboxyl group is replaced by a polyhydroxy compound group and the hydrogen of the other carboxyl by a monohydroxy alcohol group are eminently suited for plasticizing cellulose derivatives with which they are compatible. For example, an acetone-soluble cellulose acetate containing 10% of ethylene glycol dimethyl diphthalate when coated out from its solution in the form of a sheet exhibited a flexibility of 6 folds when tested on a Schopper fold tester. This sheet was subjected to heat of 65° for more than 135 days before it became brittle in contrast to only a 30-day period to produce brittleness in a sheet of non-plasticized cellulose acetate. These plasticizers are also useful in the case of cellulose nitrate and cellulose ethers. Ethylene glycol dimethyl diphthalate unlike some of the commonly employed plasticizers, is compatible in all proportions with these derivatives of cellulose.

Some examples of the use of these plasticizing compounds with organic esters for various purposes follow. These examples are to be understood as being illustrative and not for the purpose of limiting our invention.

(1) *Sheeting or film.*—100 parts of cellulose acetate having an acetyl content of 40% and a viscosity of 2,000 centipoises was dissolved in 350 parts of acetone and 15 parts of hydroquinone diethyl diphthalate was added to the solution. After the solution became homogeneous, it was coated out on to a smooth shiny surface. A flexible, transparent sheet resulted. For certain purposes it is desirable to increase the plasticity of the sheeting in which case the amount of plasticizer should be increased to 25% or 30% of the weight of the acetate.

(2) *Molding compounds.*—To 100 parts of finely pulverized cellulose acetate is added 20–50 parts of ethylene glycol dimethyl diphthalate as the plasticizer whereupon the powder may be molded by any method well known in the art, such as by heating at 140–160° C. at a pressure of 2500–4000 lbs. per square inch for 2–5 minutes. If a product having a hard surface is desired, 20 parts of the plasticizer would be sufficient while in cases where higher plasticity is preferred up to 50 parts may be employed.

(3) *Paste.*—100 parts of cellulose acetate is added to a mixture of 34 parts of ethylene glycol diethyl disuccinate, 13 parts of ethyl alcohol and 79 parts of acetone. The mixture may then be worked up to the point of homogeneity and the paste thus formed may be worked on rolls and extruded for the manufacturing of rods, tubes, etc.

(4) *Artificial leather.*—75–80 parts of pigmented glycerol trimethyl triphthalate may be added to a solution of 100 parts of cellulose acetate propionate (containing 20% propionyl and 25% acetyl) in a mixture of 80% ethylene chloride 20% methyl alcohol. This solution or dope may then be coated onto cloth which may then be subjected to warm calendering. 3 or 4 coats of the dope may be applied to give the product the desired thickness. It may then be given an embossing treatment to obtain a product physically similar to leather.

It is to be understood that these plasticizers may be employed interchangeably in various connections. For example, the glycerol trimethyl triphthalate might be employed in the paste composition or for that matter in the molding or the sheeting compositions if desired.

Some of the esters which we have prepared and have found suitable as plasticizers for cellulose derivatives particularly the organic acid esters of cellulose are:

Glycerol trimethyl triphthalate
Ethylene glycol dimethyl diphthalate
Hydroquinone diethyl diphthalate
Glycerol trimethyl trisuccinate
Ethylene glycol diethyl disuccinate
Hydroquinone dimethyl disuccinate Instead of preparing these compounds as disclosed above they may also be prepared by reacting upon an acid monobasic alcohol ester of a dicarboxylic acid with a polyhydroxy compound. For instance, if an ethyl acid phthalate, the preparation of which is disclosed in U. S. Patent No. 1,704,306 of Stinchfield, is employed as the starting material and this ester is reacted upon a polyhydroxy compound such as ethylene glycol in the presence of a suitable catalyst, an ethylene glycol diethyl diphthalate would be formed.

The mixed dicarboxylic acid esters of polyhydroxy compounds and monohydroxy alcohols may be represented structurally as follows:

Ethylene glycol diethyl diphthalate

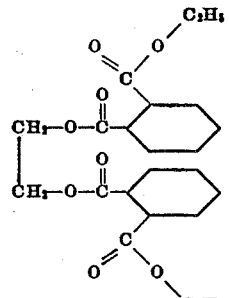

Glycerol trimethyl triphthalate

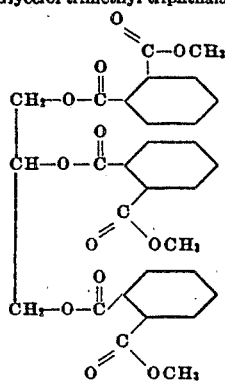

The term "polyhydroxy compound" as employed herein is to be understood as referring to compounds such as the di- or tri-hydroxy alcohol and the polyhydroxy phenols. This term does not include the group of compounds known as the saccharides which group includes sugars, starch, dextrin, cellulose, cellobiose and their immediate derivatives.

We claim as our invention:

1. The process of preparing a mixed ester of a dicarboxylic acid which comprises reacting upon a non-saccharide polyhydroxy compound with the anhydride of the dicarboxylic acid at approximately 100° C. in the presence of at least an equivalent amount of a tertiary organic base, separating the resulting product from the reaction mixture by precipitating in dilute acid and then reacting thereupon with a lower aliphatic monohydroxy alcohol in the presence of a suitable catalyst.

2. The process of preparing a mixed ester of phthalic acid which comprises reacting upon a non-saccharide polyhydroxy compound with phthalic anhydride at approximately 100° C. in the presence of at least an equivalent amount of a tertiary organic base, separating the resulting product from the reaction mixture by precipitating in dilute aqueous acid and then reacting thereupon with a lower aliphatic monohydroxy alcohol in the presence of a suitable catalyst.

3. The process of preparing a mixed ester of a dicarboxylic acid which comprises reacting upon ethylene glycol with a dicarboxylic acid anhydride at approximately 100° C. in the presence of at least an equivalent amount of a tertiary organic base, separating the resulting product from the reaction mixture by precipitating in dilute aqueous acid and then reacting thereupon with a lower aliphatic monohydroxy alcohol in the presence of a suitable catalyst.

CARL J. MALM.
CHARLES R. FORDYCE.